United States Patent Office
3,261,850
Patented July 19, 1966

3,261,850
PROCESS FOR THE CONVERSION OF 5α,6α-EPOXY STEROIDS TO THE CORRESPONDING 6β-FLUORO-5α-HYDROXY STEROIDS
Hugh V. Anderson, Oshtemo Township, Kalamazoo County, and Ingemar B. Forsblad, Portage Township, Kalamazoo County, Mich., assignors to The Upjohn Company, Kalamazoo, Mich., a corporation of Delaware
No Drawing. Filed Jan. 9, 1963, Ser. No. 250,244
5 Claims. (Cl. 260—397.1)

This invention relates to an improved process for preparing 6-fluoro steroids. More particularly it relates to an improved process for the conversion of 5α,6α-epoxy steroids to the corresponding 6β-fluoro-5α-hydroxy steroid by means of hydrogen fluoride in the presence of water and a metal fluoride salt.

Saturated and unsaturated 5α,6α-epoxy steroids of the pregnane and androstane series can be hydrohalogenated in accordance with the improved process of this invention. Representative 5α,6α-epoxy steroid starting materials, the process and the products obtained are illustratively shown by the following partial structural formulae:

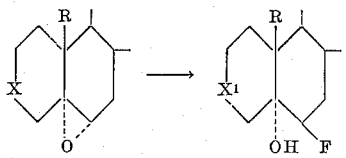

wherein R is selected from the group consisting of hydrogen and methyl, X is selected from the group consisting of the β-hydroxymethylene radical

the esterified β-hydroxymethylene radical

in which Ac is the acyl radical of an organic carboxylic acid and the ketalized carbonyl radical

in which R is an alkylene radical containing not more than 8 carbon atoms, inclusive, and the attaching oxygen to carbon bonds are separated by a chain of at least 2 and not more than 3 carbon atoms, e.g., ethylene, 1,2-propylene, 1,3-propylene, 2,2-dimethyl, 1,3-propylene, 2,3 - butylene, 2,4 - amylene, 4 - methyl - 1,2 - amylene, 6 - methyl - 1,4 - hexylene, 1,2 - heptylene, 3,4 - heptylene, 1,3-octylene, etc. and X¹ is selected from the group consisting of the β-hydroxymethylene radical; the esterified β-hydroxymethylene radical which is defined as above and the carbonyl radical.

The following are typical of the conversions represented by the above formulae:

Alkyl 3,11 - diketo - 5α,6α-epoxy - 17(20) - [cis] - pregnen-21-oate 3-alkylene ketal to the corresponding alkyl 3,11 - diketo - 5α - hydroxy - 6β - fluoro - 17(20)-[cis]-pregnen-21-oate;
5α,6α - epoxy - 17β - hydroxyandrostane - 3 - one 3-ethylene ketal to 5α,17β - dihydroxy - 6β - fluoroandrostan-3-one;
5α,6α - epoxy - 17β - hydroxy - 19 - norandrostane - 3,11-dione 3 - ethylene ketal to 5α,17β - dihydroxy - 6β-fluoro-19-norandrostane-3,11-dione;
5α,6α - epoxy - 17α - hydroxypregnane - 3,20 - dione 17-acetate 3 - propylene ketal to 5α,17α - dihydroxy - 6β-fluoropregnane-3,20-dione 17-acetate;
5α,6α - epoxy - 11β - hydroxypregnane - 3,20 - dione 3, 20 - bis - (ethylene ketal) to 5α,11β - dihydroxy - 6β-fluoropregnane-3,20-dione;
Methyl 2α - methyl - 3,11 - diketo - 5α,6α - epoxy-17(20) - [cis] - pregnen - 21 - oate 3 - ethylene ketal to methyl 2α - methyl - 3,11 - diketo - 5α - hydroxy-6β-fluoro-17(20)-[cis]-pregnene-21-oate;
5α,6α - epoxy - 9α - fluoro - 11β,17β - dihydroxy - 17α-methyl - androstane - 3 - one 3 - ethylene ketal to 6β,9α - difluoro - 17α - methyl - 5α,11β,17β - trihydroxy-androstan-3-one;
5α,6α - epoxy - 21 - hydroxy - pregnane - 3,11,20 - trione 3,20 - bis - (ethylene ketal) to 5α,21 - dihydroxy - 6β-fluoropregnane-3,11,20-trione;
5α,6α - epoxy - 11β,17α,21 - trihydroxypregnane - 3,20-dione 21 - acetate 3,20 - bis(ethylene ketal) to 6β-fluoro - 5α,11β,17α,21 - tetrahydroxypregnane - 3,20-dione 21-acetate;
3β - hydroxy - 5α,6α - epoxypregnan - 20 - one to 3β,5α-dihydroxy-6β-fluoropregnan-20-one, and
5α,6α - epoxy - 3β,17α - dihydroxypregnan - 20 - one 3-acetate to 3β,5α,17α - trihydroxy - 6β - fluoropregnan-20-one 3-acetate.

The 5α-hydroxy-6β-fluorosteroids produced by the improved process of this invention are useful intermediates in the production of known, highly active, Δ⁴ and Δ¹,⁴-6α-fluoro-steroid compounds, e.g., U.S. Patents 2,838,492; 2,838,497 and 2,838,540.

Heretofore 5α,6α-epoxy-steroids have been converted to the corresponding 5α-hydroxy-6β-fluoro steroid in only relatively low yields, 50% and less, by the use of anhydrous hydrogen fluoride in an organic solvent such as tetrahydrofuran and dimethylformamide, e.g., U.S. Patents 3,049,566 and 3,007,923, respectively, or by the use of aqueous hydrogen fluoride in the presence of an organic solvent, such as methylene chloride, e.g., U.S. Patent 2,838,497.

According to the improved process of this invention, it has now been discovered that 5α,6α-epoxy steroids can be converted to the corresponding 5α-hydroxy-6β-fluoro steroid in greatly increased yields, and in improved quality of product. The unexpected and exceptionally high yields obtained by the process of this invention greatly overcomes any inherent disadvantage which might be construed to exist because of the relatively low reaction temperatures necessary in carrying out the reaction. The improved process of this invention possesses the additional advantage of yielding final products which are readily recovered from the reaction medium by conventional methods in relatively pure form.

In carrying out the improved process of this invention the selected 5α,6α-epoxy steroid is preferably added to a reaction medium of hydrogen fluoride, water and a metal fluoride salt, e.g., sodium fluoride, potassium fluoride, lithium fluoride, sodium bifluoride, potassium bifluoride, silver fluoride, calcium fluoride, and the like; alkali metal fluorides are preferred and sodium fluoride and potassium fluoride are especially advantageous. This reaction medium is conveniently prepared by adding the fluoride salt and water to cold hydrogen fluoride, at a temperature below about —10° C. to avoid excessive loss of hydrogen fluoride. The selected 5α,6α-epoxy steroid is then added to this reaction medium either as a solid, preferably in a finely divided form or more advantageously in solution in a minimum amount of a suitable organic solvent in which the steroid is readily soluble, e.g., methylene chloride, chloroform, ethylene chloride, carbon tetrachloride, etc., the smallest amount of solvent possible is desirable in order to prevent the formation of a two-phase system in the reaction medium.

In the improved process of this invention the hydrogen fluoride serves both as a solvent for the steroid and as a reagent. The reaction is catalyzed by the presence of water and the fluoride salt. The reaction is conducted using an excess of hydrogen fluoride to steroid reactant. The molar concentration of hydrogen fluoride relative to starting 5α,6α-epoxy steroid can range from a mole ratio of about 25:1 to 500:1, a range of about 60:1 to 300:1 is generally preferred and a range of about 150:1 to 160:1 is especially advantageous. The molar ratio of flouride salt to hydrogen fluoride present in the reaction medium can range from a mole ratio of about 1:10 to 1:625, however, about 1:10 to 1:50 is generally preferred and a range of about 1:15 to 1:25 is especially advantageous. The mole ratio of water present in the reaction medium can range from a molar concentration of water relative to hydrogen fluoride of from about 1:5 to 1:500, a range of about 1:10 to 1:300 is preferred, and a range of about 1:20 to 1:30 is especially advantageous. The improved process of this invention is operative using higher ratios of hydrogen fluoride to steroid and fluoride salt to hydrogen fluoride but larger amounts only add to the cost of the process without producing substantial improvements over the prescribed ratios.

The reaction is preferably carried out under conditions of continual stirring or other agitation. The reaction which is exothermic is carried out below about $-50°$ C., a temperature range of $-50°$ C. to $-80°$ C. is preferred, and with about $-50°$ C. to $-65°$ C. being particularly advantageous. The steroid can be added continuously or portionwise to the reaction medium at such a rate that the prescribed temperatures can be maintained. After the steroid has been added it is desirable to continue agitation of the reaction mixture within the prescribed temperature range until the reaction is essentially complete.

After completion of the fluorination reaction, the desired product is easily recovered from the reaction medium by conventional methods, e.g., the reaction mixture can be quenched in aqueous alkali, preferably below 10° C. to avoid the formation of undesirable by-products. Any alkali can be used for this purpose, although aqueous alkali metal carbonates such as potassium or sodium carbonate, are preferred. The amount of alkali should be sufficient to neutralize the excess hydrogen fluoride and render the mixture slightly alkaline. The 6β - fluoro - 5α - hydroxy steroid precipitates from this aqueous mixture as a crystalline solid which is readily recovered by filtration. The 6β-fluoro-5α-hydroxy steroid thus obtained can be further purified by recrystallization from a suitable organic solvent in accordance with methods well known in the art.

The following examples illustrate the application of the above-described process but are not to be construed as limiting.

*Example 1.—Methyl 3,11-diketo-5α-hydroxy-6β-fluoro-17(20)-[cis]-pregnen-21-oate*

A mixture of 22.7 g. of sodium fluoride, 6.70 g. of water and 200 g. of anhydrous hydrogen fluoride was cooled to about $-65°$ C.; 27.0 g. of methyl 3,11-diketo-5α,6α-epoxy-17(20)-[cis]-pregnen-21-oate 3-ethylene ketal was then added slowly as a solid with agitation keeping the temperature below $-60°$ C. by external cooling. After all of the steroid starting material was added the reaction mixture was stirred for an additional 20 minutes keeping the temperature between $-65°$ C. and $-70°$ C. The reaction mixture was then quenched into a solution of 1,240 g. of potassium carbonate in 6.5 liters of ice-water about 1:1. The mixture was stirred for about ½ hour keeping the temperature below 10° C. The precipitate thus obtained was collected on a filter, washed with about 2 liters of cold water and dried in a vacuum oven at 70° C. to give 25.0 g. (98.4% yield) of methyl 3,11 - diketo - 5α - hydroxy - 6β - fluoro - 17(20)-[cis]- pregnen-21-oate, M.P. 242.0° C., dec.; $[\alpha]_D$ +21 (dioxane); 1–2% impurities by papergram.

*Analysis.*—Calcd. for $C_{22}H_{29}O_5F$: F, 4.84 Found: F, 4.60.

Recrystallization from methanol gave methyl 3,11-diketo - 5α - hydroxy - 6β - fluoro - 17,20[cis]-pregnen-21-oate, M.P. 232.5° C., dec.; $[\alpha]_D$ +23 (dioxane).

*Example 2.—Methyl 3,11-diketo-5α-hydroxy-6β-fluoro-17(20)-[cis]-pregnen-21-oate*

A cold reactor was charged with 7.4 parts (the parts referred to in this example are by weight) of hydrogen fluoride and cooled to below $-50°$ C. with agitation, 0.84 part of sodium fluoride was then added keeping the temperature below $-30°$ C. The hydrogen fluoride mixture was then again cooled to below $-50°$ C. and 0.248 part of water was added slowly again keeping the temperature below $-30°$ C. This hydrogen fluoride mixture was then cooled to below $-60°$ C. and 1.0 part of methyl 3,11-diketo-5α,6α-epoxy-17(20)-[cis]-pregnen-21-oate 3-ethylene ketal dissolved in 1.67 parts of methylene chloride was added slowly at such a rate that the temperature was maintained below $-50°$ C. Approximately 0.33 part of additional methylene chloride was used to rinse all of the steroid solution into the reaction vessel. The reaction mixture was then stirred for approximately 2 hours keeping the temperature between $-50°$ C. and $-65°$ C. At the end of the reaction period the reaction mixture was slowly added to a solution of 45.9 parts of potassium carbonate in 75 parts of water containing 50 parts of ice. The temperature was maintained below 10° C. during the addition. The reactor was rinsed with 0.8 part of acetone which was added to the neutralizing solution and the neutralized mixture was then stirred for ½ hour. The crystalline product thus obtained was collected on a filter and washed thoroughly with cold water. The product was then dried at 70–75° C. in vacuum oven to give 0.92 part (97.7% yield) of methyl 3,11-diketo-5α-hydroxy-6β-fluoro-17(20)-[cis]-pregnen-21-oate, M.P. 220–240° C., $[\alpha]_D$ +22 (dioxane).

The product thus obtained can be further purified if desired by recrystallization from a suitable organic solvent, e.g., methanol.

*Example 3.—Methyl 3,11-diketo-5α-hydroxy-6β-fluoro-17(20)-[cis]-pregnen-21-oate*

The procedure of Example 2 was repeated using a stoichiometric equivalent amount of potassium fluoride in place of sodium fluoride to give a substantially equivalent yield of methyl 3,11-diketo-5α-hydroxy-6β-fluoro-17(20)-[cis]-pregnene-21-oate.

In the same manner other metal fluoride salts, e.g., those previously listed, can be substituted for sodium or potassium fluoride to give substantially the same results.

We claim:
1. In a process for converting a steroid, selected from the group consisting of saturated and unsaturated 5α,6α-epoxy steroids of the pregnane and androstane series to the corresponding 6β-fluoro-5α-hydroxy steroid by reacting the said 5α,6α-epoxy steroid with hydrogen fluoride the improvement which comprises carrying out the reaction in the presence of water and a metal fluoride salt at temperatures below about $-50°$ C.

2. In a process for converting a steroid, selected from the group consisting of saturated and unsaturated 5α,6α-epoxy steroids of the pregnane and androstane series to the corresponding 6β-fluoro-5α-hydroxy steroid by reacting the said 5α,6α-epoxy steroid with hydrogen fluoride the improvement which comprises carrying out the reaction in the presence of water and an alkali metal fluoride salt at a temperature within the range of from about $-50°$ C. to $-80°$ C. wherein the mole ratio of hydrogen fluoride to the selected 5α,6α-epoxy steroid is within the range of from about 60:1 to 300:1, the mole ratio of water to hydrogen fluoride is within the range of from about 1:10 to 1:300 and the mole ratio of alkali metal fluoride salt to hydrogen fluoride is within the range of from about 1:10 to 1:50.

3. The process of claim 2 for the production of methyl 3,11 - diketo-5α-hydroxy-6β-fluoro-17(20)-[cis]-pregnen-21-oate, wherein the starting steroid is methyl 3,11-diketo-5α,6α - epoxy - 17(20) - [cis]-pregnen-21-oate 3-ethylene ketal.

4. The process which comprises reacting methyl 3,11-diketo-5α,6α-epoxy-17(20)-[cis]-pregnen-21-oate 3-ethylene ketal with hydrogen fluoride in the presence of water and sodium fluoride at temperatures within the range of from about −50° to −65° C. wherein the mole ratio of hydrogen fluoride to the starting 5α,6α-epoxy steroid is within the range of from about 150:1 to 160:1, the mole ratio of water to hydrogen fluoride is within the range of from about 1:20 to 1:30 and the mole ratio of sodium fluoride to hydrogen fluoride is within the range of from about 1:15 to 1:25, to produce methyl 3,11-diketo - 6β - fluoro-5α-hydroxy-17(20)-[cis]-pregnen 21-oate.

5. The process of claim 4 wherein the alkali metal salt is potassium fluoride.

References Cited by the Examiner
UNITED STATES PATENTS

| | | | |
|---|---|---|---|
| 2,838,502 | 6/1958 | Beal et al. | 260—239.55 |
| 3,009,930 | 11/1961 | Reimann et al. | 260—397.3 |
| 3,022,295 | 2/1962 | Berg et al. | 260—239.55 |
| 3,086,032 | 4/1963 | Gerber | 260—397.3 |

LEWIS GOTTS, *Primary Examiner.*

ELBERT L. ROBERTS, *Assistant Examiner.*